Patented Nov. 24, 1942

2,303,192

UNITED STATES PATENT OFFICE 2,303,192

COMPOSITION AND METHOD

John H. Billman, Bloomington, Ind.

No Drawing. Application December 4, 1940,
Serial No. 368,507

6 Claims. (Cl. 47—58)

This invention relates to plant stimulants and is particularly directed to plant stimulant compositions containing as an essential active ingredient beta-1-naphthoylpropionic acid and to methods in which the growth characteristics of plants are modified by application of this compound.

The art of modifying plant growth by the application of artificial stimuli has in recent years been centered around the discovery of so-called plant hormones. Many materials have been discovered which when applied to plant structure in minute amounts act as a stimulus to abnormal development of the plant. Simple chemical compounds that are readily synthesized have been found which stimulate root growth, which stimulate seed germination and which in other ways modify the growth characteristics of plants. The discoveries by various workers in the art that such materials as indoleacetic acid, indolebutyric acid, indolepyruvic acid, naphthalene acetic acid, naphthalene butyric acid, phenylacetic acid, naphthalene glycolic acid, etc., have such properties has led to increased activity and intensive research in the art.

While numerous compounds have been tested as plant stimulants and a considerable number found to be effective, naphthalene acetic acid and its derivatives seems to be the only material which is both sufficiently effective and sufficiently cheap to be commercial. Even this material is difficult to synthesize so that much remains to be desired from an economic point of view. Additionally naphthalene acetic acid does not have as wide range of tolerance as would be desirable. In other words, the difference between the effective concentration and that which causes injury to the plant is in many applications relatively small so that a degree of precision is required in its application which is not always easily obtained in view of the nature of the art.

I have now found that beta-1-naphthoylpropionic acid has plant stimulating properties and may be used in various types of compositions and may be applied in different manners to prevent or retard the normal separation of parts of plants due to deterioration of the absciss layer, or in other words as an anti-drop chemical to retard or prevent premature drop of fruit or foliage or other separable parts of the plant. As compared with the prior art this compound is safe, effective and readily available. It may be prepared by simple and effective syntheses. When applied in proper concentrations it has the same order of effectiveness as the prior art materials and it may be applied in higher concentrations without deleteriously affecting plants.

This compound may be prepared, among other ways, from naphthalene and succinic anhydride by a Friedel-Crafts reaction. See Journal of the Chemical Society, p. 1125 (1932). Two isomers are obtained which can be separated by fractional crystallization. These are the beta-1-naphthoyl and beta-2-naphthoyl acids which respectively have the following formula:

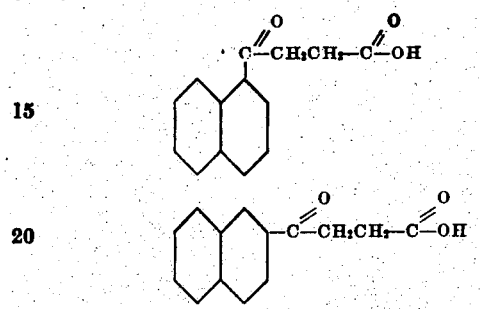

The salts, esters and amides of these esters may be obtained in a known manner and bear the relation to the acids that on hydrolysis they yield the free acid. I believe it is the acid which is the effective stimulant, and such materials which are capable of yielding the free acid come within the scope of the invention. Hence, when I use the term "acid" unqualified I mean to include both the free and the combined acid, the latter being those types of compounds, such as salts, esters and amides, which are capable of hydrolyzing to the free acid.

The compounds of this invention may be used in a variety of ways to stimulate intact plants to prevent premature drop of fruit, foliage and like separable parts. In the application of the compounds for these purposes different compositions may be employed. For the most part aqueous solutions will be found most desirable. These solutions may include wetting agents or adhesives, or both. Colloidal materials such as soluble gums or resins may be included; also, water-soluble polymers such as polyvinyl alcohol. The compounds also may be applied in admixture with other diluents either as pastes or dusts. Thus the materials may be incorporated in oils, fats, or similar vehicles such as lanolin, or in a finely divided inert such as talc, flour, fuller's earth, clay or other soluble or insoluble finely divided solids.

According to the invention the compounds may be applied to mature plants to prevent separation of parts by disintegration of the absciss layer. Various parts of mature plants, such as leaves, flowers and fruit, are connected to the main body of the plant by a layer of abscission cells. It is deterioration of these cells which causes the separation of these parts from the plant proper. In the harvesting of various crops premature separation of these parts may cause serious loss.

Premature drop of this character may in some cases be prevented by the application of the stimulant in aqueous solution. Anti-drop treatments are of particular value in preventing premature drop of apples. Such treatments not only permit increased harvests of saleable apples but also admit of a longer ripening period necessary to good color. Application of sprays are made at the imminence of dropping, that is, when normal healthy fruit begins to drop. Application may be applied, for example, from ten days to three weeks before harvest. One spray is usually sufficient, but with some varieties two sprays may be desirable. These sprays are dilute aqueous solutions applied with the usual apparatus and in the customary manner of applying orchard sprays.

The concentration of the anti-drop sprays is very small and may be expressed in grams per hundred gallons or milligrams per liter. To obtain the desired concentrations it is first desirable to prepare standard compositions containing a large proportion of diluent in order that the sprays may be made up on the basis of pounds per hundred gallons or pints per hundred gallons. Standard compositions may be prepared by diluting the stimulant with a water-soluble, finely divided, inert solid or with a water-miscible solvent. Suitable compositions which can be used at the rate respectively of ½ lb. per hundred gallons and 1 pint per hundred gallons and have been found effective on such varieties as Stayman Winesap, Delicious, McIntosh and Williams are prepared by mixing 10 to 20 grams of beta-1-naphthoylpropionic acid per pound with a finely divided, water-soluble inert solid such as sodium sulfate, sodium carbonate, borax or sulfamic acid, or by dissolving beta-1-naphthoylpropionic acid in a water-miscible solvent such as ethyl alcohol in the proportions of 5 to 10 grams per pint.

While I have disclosed my invention with reference to particular applications it is to be understood that it is not limited in these respects but is directed to the application of the particular stimulants described in any manner which leads to the retardation or prevention of separation of parts of the plant through deterioration of the absciss layer. The general characteristic is that of modifying the development of the absciss layer in the manner which favors retention of the part. The compounds are not to be confused with fertilizers which are more properly a food and do not alter the growth characteristics of the plant. Nor are they to be confused with plant poisons which simply alter and destroy. Additionally, a plant stimulant is effective in minute amounts, the effective concentrations usually being easily set forth in parts per million or milligrams per liter.

The effectiveness of the compounds of the invention will vary according to their individual characteristics, according to the type of plant structure treated, according to the purpose of the treatment, and according to the vehicle from which it is applied. For example, a different concentration may be required for one variety of plant as compared with another. Those skilled in the art having these various factors in mind will readily be able to determine conditions most suitable in any given case. Further than this, it can only be stated that when the materials are applied from aqueous dispersion (solution or otherwise) it will ordinarily be unnecessary or undesirable to employ more than 30 milligrams per liter. Any smaller amount which is sufficiently effective may be employed, and, as already pointed out, optimum conditions generally usually obtain at much smaller concentrations.

Since many apparently widely differing embodiments of the invention may be made it is to be understood that such modifications as come within the spirit of the invention are intended to be included within the scope of the claims.

I claim:

1. In the propagation of plants the method of retarding the normal separation of parts due to deterioration of the absciss layer which comprises treating at the imminence of abscission at least the portions of the plant having absciss layers with beta-1-naphthoyl-propionic acid.

2. An anti-drop composition for use in delaying separation of parts of plants due to deterioration of the absciss layer which contains as an essential active ingredient beta-1-naphthoyl-propionic acid.

3. An anti-drop composition for use in delaying separation of parts of plants due to deterioration of the absciss layer comprising beta-1-naphthoylpropionic acid in admixture with a water-soluble diluent.

4. In the propagation of plants the method of retarding the normal separation of parts due to deterioration of the absciss layer which comprises treating at the imminence of abscission at least the portions of the plant having absciss layers with free beta-1-naphthoylpropionic acid.

5. An anti-drop composition for use in delaying separation of parts of plants due to deterioration of the absciss layer which contains as an essential active ingredient free beta-1-naphthoylpropionic acid.

6. An anti-drop composition for use in delaying separation of parts of plants due to deterioration of the absciss layer comprising free beta-1-naphthoylpropionic acid in admixture with a water-soluble diluent.

JOHN H. BILLMAN.